United States Patent [19]

Engler et al.

[11] Patent Number: 5,216,792
[45] Date of Patent: Jun. 8, 1993

[54] METHOD OF AND DEVICE FOR OBTAINING SHORT SHAVINGS TRIMMED FROM THE SEAMS INSIDE LONGITUDINALLY WELDED PIPES

[75] Inventors: Bernd Engler; Helmut Will, both of Hamm, Fed. Rep. of Germany

[73] Assignee: Hoesch Aktiengesellschaft, Dortmund, Fed. Rep. of Germany

[21] Appl. No.: 892,281

[22] Filed: Jun. 2, 1992

Related U.S. Application Data

[63] Continuation-in-part of Ser. No. 716,706, Jun. 18, 1991, abandoned.

[30] Foreign Application Priority Data

Jun. 30, 1990 [DE] Fed. Rep. of Germany ....... 4020924

[51] Int. Cl.⁵ ..................... B23P 23/00; B23Q 11/00; B23D 1/00
[52] U.S. Cl. ..................... 29/33 T; 409/299
[58] Field of Search ............. 29/33 T, 33 D; 409/299, 409/300, 297, 298, 307, 143, 258

[56] References Cited

FOREIGN PATENT DOCUMENTS

| 3825919 | 8/1989 | Fed. Rep. of Germany ...... 409/299 |
| 194814 | 11/1982 | Japan ................... 29/33 T |
| 161011 | 8/1985 | Japan ................... 29/33 T |
| 207656 | 2/1968 | U.S.S.R. ................ 409/299 |
| 848143 | 7/1981 | U.S.S.R. ................ 409/299 |
| 941019 | 7/1982 | U.S.S.R. ................ 29/33 T |
| 1349818 | 11/1987 | U.S.S.R. ................ 409/299 |

Primary Examiner—William Briggs
Attorney, Agent, or Firm—Max Fogiel

[57] ABSTRACT

An arrangement for trimming short shavings from a seam inside a longitudinally welded pipe having a longitudinal axis, in which an inside shaving is scraped off continuously with a stationary blade by moving the pipe relative to the blade. The inside shaving is then cut up discontinuously with an actuated knife inside the pipe. The scraping procedure is carried out with scraping forces having a resultant force vector lying substantially in a plane through the longitudinal axis of the pipe and the seam. The scraping procedure is dependent on the speed of the moving pipe, whereas the cutting procedure is independent of the speed of the moving pipe.

17 Claims, 1 Drawing Sheet

METHOD OF AND DEVICE FOR OBTAINING SHORT SHAVINGS TRIMMED FROM THE SEAMS INSIDE LONGITUDINALLY WELDED PIPES

The present application is a continuation-in-part of the parent application Ser. No. 716,706 Filed Jun. 18, 1991.

BACKGROUND OF THE INVENTION

The invention concerns a method of and device for obtaining short shavings trimmed from the seams inside longitudinally welded pipes.

When pipes are welded with longitudinal seams, and especially when strips of steel are shaped with rollers or cages for example into a cylinder with a longitudinal seam that must be welded tight, the pressure exerted on the weld by the edges of the strip leaves a bead of expressed and solidified molten metal along the seam on both the inner and outer surface of the pipe.

This material is ordinarily removed from inside and outside the pipe by trimming tools that follow the welding point. The particles removed in the outer trimming process are relatively easy to handle. They are accessible enough and have enough free space around them to be transferred to scrap baskets, chopped short, and removed or simply conveyed along gutters to a chopping station.

The shaving removed by the inside trimming process, however, remains inside the pipe in the form of a long and continuous strip.

The lengthy shaving not only entails drawbacks during the subsequent cutting of the "endless" billet into sections due to increased wear on the saw blade as the result of sudden and irregular stress on the teeth but also slides part-way out of the sections as they are removed to one side, hanging from their ends and endangering the personnel in the immediate vicinity. The lengthy shaving is also very difficult to remove with high-pressure water or long-shafted brushes.

Proposals have been advanced to eliminate these drawbacks by notching the inside bead before trimming it in order to obtain a shaving that is either already broken up or easy to break up. The notching rollers employed for this purpose, however, can damage the inner surface of the pipe and even produce incisions deep enough to make the pipe wall too thin in the vicinity of the seam, eventually resulting in stress peaks and decreasing fatigue strength when pressure is applied to the inside of the installed pipe.

German Application 3 219 369 discloses a method of and device for obtaining short shavings. The trimmed-off shaving exerts a transverse force that produces torque on a tool holder and hence on cutters mounted on the holder at an angle. The cutters are mounted adjacent and overlapping and accordingly generate short individual shavings.

Since, however, stress peaks are known to occur when inside shavings are trimmed from hot-working steels in particular while the cutter is entering or leaving the work, the inside edging bead in this case, the method disclosed in the aforesaid document results in excessive downtime due to the constant need to replace the cutters.

Furthermore, the transverse forces needed to maintain rotation result in reaction forces on the trimming tool that, since the tools are usually mounted at the ends of relatively long shafts, make them vibrate transversely and hence trim irregularly.

SUMMARY OF THE INVENTION

The object of the present invention is accordingly a method and device that are without the aforesaid drawbacks, that will result in short inside shavings of uniform shape, that will allow the trimmers to be set reproducibly and the trimmers and cutters to be replaced easily and with little downtime, and that will not lead later to negative geometric results in the vicinity of the seam when the inside-trimmed pipes are in operation.

The method according to the present invention essentially comprises dividing the overall process into the two steps of scraping and cutting, each carried out with a different tool. The scraping is continuous and depends on the speed of the pipe, and the cutting is discontinuous. The resultant vector of the scraping forces extends substantially in a plane through the axis of the pipe and the seam.

The advantage of this approach is that the actual process of inside trimming is carried out by a scraper that remains stationary once it has entered the edging bead, so that the scraping geometry will not deviate periodically, undulatingly for example, from the ideal shape and so that downtime will not be increased by constant entry into and exiting from the material.

The method in accordance with the invention will no allow vertical transverse oscillations of the scraper because the resultant force vector of the scraping forces extends substantially in a plane through the axis of the pipe and the welding seam and accordingly generates reaction forces that essentially act longitudinally and parallel to the shaft that the tool is mounted on the end of.

Cutting that is independent of the speed of the pipe allows advantageously brief cutting frequencies and hence shavings that can be as short as a few centimeters.

Cutting alternately in the same direction as and in a direction opposite the direction the pipe is traveling in and positioning the resultant force vector of the cutting force also substantially in the plane through the axis of the pipe and the welding seam, decreases to advantage the generation of oscillations on the part of the driving masses at an angle to the direction of production when the pipe is narrow and the shafts that secure the tools are accordingly slender.

In this event it is of advantage to reduce the transverse mass forces even more by also orienting the forces that activate the mechanized knives parallel to the axis of the pipe and substantially in the plane through that axis and the welding seam.

Since the size and design of the tool holders will essentially generate transverse oscillations in especially large pipes, those with an inside diameter of 500 mm or more, only as the result of scraping forces or activating forces, structural advantages can be obtained for the cutting device while retaining the separation of the scraping and cutting functions and the resultant scraping-force vector by ensuring that the resultant vector of the cutting force will intersect or extend at an angle to the plane through the axis of the pipe and the welding seam.

Small cutting frequencies can accordingly be attained to advantage by transversely oscillating cutting tools.

When the mechanisms that generate the activating forces are accommodated inside electric-resistance compression-welded pipes with longitudinal seams, it is also of advantage to avoid interference from induced currents to generate the forces with compression media, pneumatically or hydraulically for example.

When the activating force is transmitted by rods and/or spindles that act parallel with the shaft that secures the tool, it is simple to install an electric motor outside the pipe.

The scraper and the cutter are integrated into a supporting frame made out of box section. The frame and the cutter have openings and recesses for removing the shavings. The advantage is that the tools can be replaced rapidly and easily just by replacing the whole frame even though the scraping and cutting functions are still kept separate.

Furthermore, if the cutter travels parallel to the axis 19 of the pipe, there will be, when the machinery is in operation, no mass acceleration at an angle to the scraper and hence none of the previously mentioned negative results with respect to scraper geometry.

Also of advantage in reaction to reproducibly uniform scraping is the additional tilt of the frame accommodating the scraper and cutter that is produced automatically a pair of duplicating rollers even after the tools have been replaced.

One embodiment of the present invention includes a small and practical component that orients the cutting motions parallel to the longitudinal axis of the pipe, with both the forward and backward motion exploited for one cutting process each.

Access for the precise adjustment of the scraper during a brief downtime is facilitated by the mechanisms 30, 31, and 32 that intercept and secure the scraping blade 29 projecting beyond the upper edge of supporting frame 3 and that can easily be reached through a maintenance aperture 34.

The mass acceleration of transmission rods paralleling positioning rod 2, for example, can be prevented if the mechanism that activates the cutter is a linear activating mechanism 42 integrated into the pipe.

To eliminate the effects of inductive currents, the linear activating mechanism employed with electrically welded pipes is a hydraulic or pneumatic cylinder.

When the pipe has a long enough diameter, the activating mechanism is positioned outside the pipe to ensure satisfactory access.

One embodiment of the activating mechanism that is especially simple and appropriate for pipes that can be manufactured with thick walls and with extensive geometrical tolerance in the vicinity of the scraping process features an activating mechanism in the form of a friction wheel accommodated inside the pipe.

The structure and function of the device will now be specified with reference to a possible embodiment.

BRIEF DESCRIPTION OF THE DRAWING

A cross-sectional view of the device positioned inside a pipe, and shows the essential elements, in accordance with the present invention.

DESCRIPTION OF THE PREFERRED EMBODIMENTS

Figure 1:
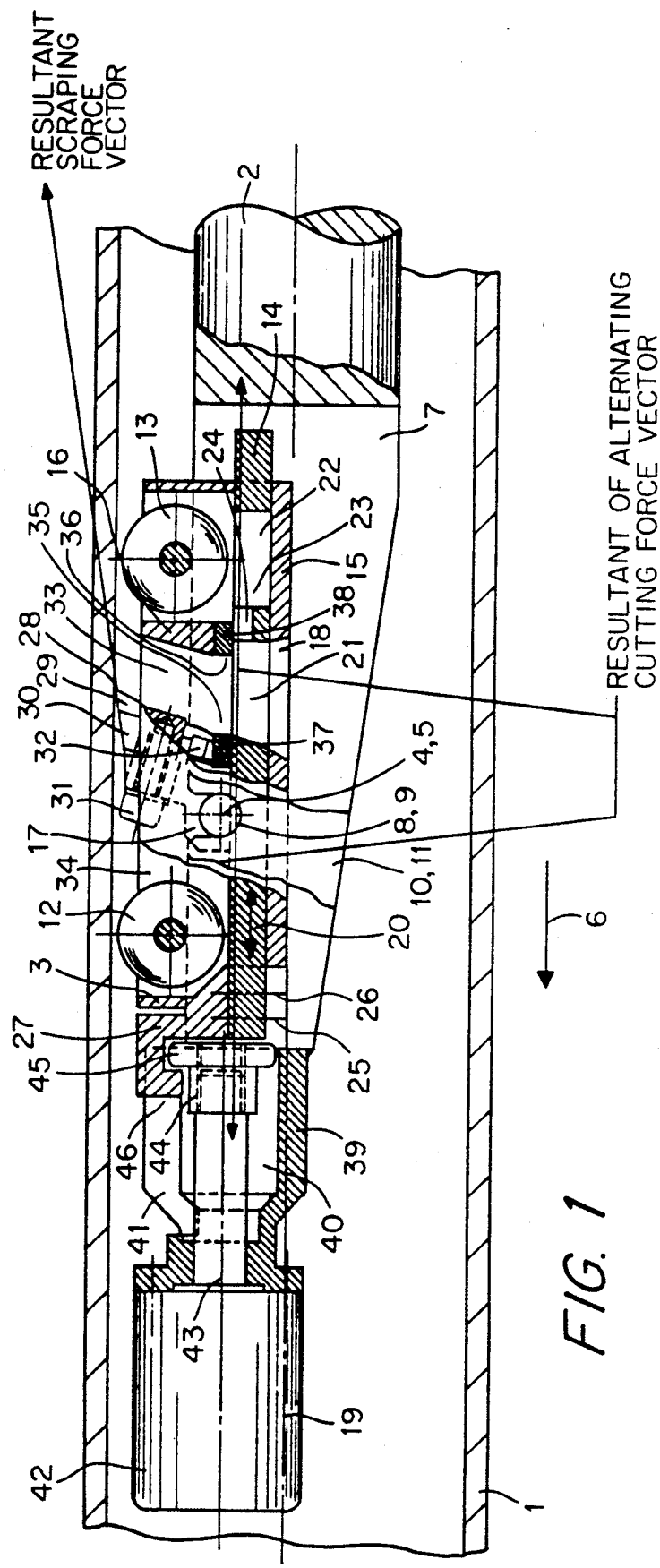

FIG. 1 illustrates a device in accordance with the invention accommodated inside a pipe 1. The device tilts back and forth in a positioning rod 2 on bolts 4 and 5 secured to a supporting frame 3. The end of positioning rod 2 that is downstream, in terms of the direction 6 the pipe is traveling in, has a slot 7 and recesses 8 and 9 in lateral flanges 10 and 11 to accommodate bolts 4 and 5. The overall frame can accordingly tilt 6° and will readily assume a position constantly paralleling the surface of the pipe as duplicating rollers 12 and 13 come to rest against the inner surface of the pipe once the machinery is in operation.

The illustrated pipe 1 has been cut in the middle of the welding seam, which is not specifically illustrated and is represented by the upper surface of the incision in the drawing.

At the bottom of supporting frame 3 is an oblong opening 14 that is essentially demarcated by a lower web 15 and two transverse intermediate webs 16 and 17. Lower web 15 has an opening 18 for removing shavings.

A knife holder 20 travels back and forth parallel to the axis 19 of the pipe and inside oblong opening 14 and has two recesses 21 and 22 for removing shavings and a transverse groove 23 that accommodates a bottom knife 24 that cuts to each side.

The end of knife holder 20 that faces away from positioning rod 2 has mechanisms 25 and 26 that secure a carrier 27. The system employed in the illustrated embodiment involves unillustrated countersunk perforations accommodating cylindrical screws that screw into matching threaded bores on the bottom of carrier 27.

A scraping blade 29 is secured at the desired scraping depth in the intermediate web 17 between the duplicating rollers 12 and 13 upstream and downstream of scraping point 28 in supporting frame 3 by means of interception and securing mechanisms 30, 31, and 32. These mechanisms in the illustrated embodiment comprise a base plate 30, a fastening screw 31, and a set screw 32 for adjusting the depth of the tool.

The recess 33 between intermediate webs 16 and 17 also allows the removal of shavings. Aperture 34 not only accommodates the rollers but provides access to fastening screw 31 for replacing the tool.

At the bottom of intermediate webs 16 and 17 are transverse grooves 35 and 36 that accommodate upper knives 37 and 38. A securing bell 39 is welded tight to the lateral flanges 10 and 11 at the out-take end of positioning rod 2.

Securing bell 39 has a graduated aperture 40 and a longitudinal groove 41 to guide carrier 27 and the knife holder 20 that is attached to it.

A linear activating mechanism 42 secured to the out-take end of securing bell 39 has a thrust rod 43 that extends through aperture 40 opposite direction 6. Thrust rod 43 has a thread 44 that a flange 45 is screwed onto.

Flange 45 is round and engages, loosely enough to allow supporting frame 3 to tilt, below a collar 46 of carrier 27.

The lines that supply fluid to hydraulic cylinder 42 from outside are not illustrated.

When the mechanisms are in a stationary operating state, the inside edging bead is permanently trimmed off at scraping point 28 by scraping blade 29, travels through recesses 33 and 21 and opening 18 into the lower half of the pipe, immediately encounters the wall at the bottom of the pipe, and is entrained by the pipe as it travels in direction 6. Subsequent to an interval that depends on how long the shaving is to be, double-action linear activating mechanism 42 is engaged and by way of thrust rod 43, flange 44, and carrier 27 forces knife holder 20 far enough in direction 6 for recess 22 to arrive at the point previously occupied by recess 21.

The exiting shaving is sheared off by knives 37 and 24 during this process. The sheared-off shaving is forced out at the out-take end by the moving pipe and the other scraped-off shaving travels through recesses 33 and 22 and opening 18.

Subsequent to another interval, cylinder 42, which is now traveling in the opposite direction, forces knife holder 20 back into its original position, with the shaving now being sheared off by knives 38 and 24 and the additional shaving leaving again through recesses 33 and 21 and opening 18. Depending on the particular intervals and accordingly on the cutting frequency, the shavings can be centimeters, decimeters, or meters long and can in the simplest case be blown out once the pipe has been cut to length, subsequent to which they can be employed without further processing as scrap metal for a blast furnace.

In analyzing the scraping forces, it is essential to note that these forces are generated by a scraper in the form of a scraping blade 29. This blade can be a thin element, and when the edge of such a blade is compared relative to the dimensions of the pipe being scraped, then such an edge can be looked upon substantially as a line without introducing any significant error in the force analysis. Accordingly, the scraping action between the blade edge and the pipe internal surface can be considered to take place along substantially a line, without introducing significant error as a result of such an assumption. Under that condition, it is reasonable to consider and state that the scraping forces lie substantially in a plane passing through the blade edge or passing through the seam as well as the pipe axis.

If, on the other hand, the preceding assumption is not to be made, and the thickness of the blade is to be taken into account and not to be assumed thin compared to the pipe diameter, for example, then the scraping forces become distributed over the surface (not line) of the scraping blade edge. The scraping forces here are considered to include the frictional forces that arise from the scraping action. Although these scraping forces are distributed over a surface, they are in close proximity to the aforementioned plane through the seam and the longitudinal pipe axis. It is thereby correct to state that the scraping forces lie substantially in a plane through the longitudinal axis of the pipe and the seam.

It is a basic concept from the field of mechanics that a plurality of forces acting on a surface, for example, can be considered to possess a resultant force vector which takes into account the magnitudes and directions of the various acting forces. This resultant force vector has also both magnitude and direction. This very basic concept is illustrated in substantially every school textbook on this subject, as represented by, for example, "Physics" by Alonso and Finn, 1970, Addison-Wesley Publishing Co., pages 110, 111 and FIGS. 7.8 and 7.9.

Thus the scraping forces inherently produce such a resultant force vector from the laws of mechanics. Accordingly, given that there are scraping forces present as a result of the scraping action of the blade 29, these scraping forces must necessarily have a resultant force vector, and since this concept is well known in the art, it is not necessary to describe this concept further in the application.

Whereas the pipe seam can be longitudinal or straight-lined, the seam can also have a helical or a curved shaped. The scraping blade can correspondingly have straight-lined shape or a curved shape.

We claim:

1. A method for trimming short shavings from a seam inside a longitudinally welded pipe having a longitudinal axis, comprising the steps of: scraping off continuously an inside shaving with a stationary blade by moving the pipe relative to said blade; cutting up discontinuously, thereafter said inside shaving with an actuated knife inside the pipe, said scraping step being carried out with scraping forces having a resultant force vector lying substantially in a plane through said longitudinal axis of said pipe and said seam.

2. A method as defined in claim 1, wherein said scraping step depends on the speed of said moving pipe, said cutting step being independent of the speed of said moving pipe.

3. A method as defined in claim 1, wherein said cutting step is carried out alternately back-and-forth in relation to the direction of motion of the pipe, said cutting step being carried out with cutting forces having a resultant force vector lying substantially in a plane through said longitudinal axis of the pipe and the seam of the pipe.

4. A method as defined in claim 1, wherein said cutting step comprises a transverse oscillation in relation to the direction of motion of the pipe, said cutting step being carried out with cutting forces having a resultant force vector intersecting substantially a plane through said longitudinal axis of the pipe and the seam of the pipe.

5. A method as defined in claim 1, wherein said knife is actuated by a force directed parallel to said longitudinal axis of the pipe and to a plane through said longitudinal axis and the seam.

6. A method as defined in claim 5, wherein said force actuating said knife is generated by fluids inside the pipe.

7. A method as defined in claim 5, wherein said force actuating said knife is generated electrically outside the pipe.

8. An arrangement for trimming short shavings from a seam inside a longitudinally welded pipe having a longitudinal axis, comprising: means for scraping off with a stationary blade continuously and inside shaving by moving the pipe relative to said blade; cutting means with an actuated knife for cutting up discontinuously thereafter said inside shaving inside the pipe, said scraping means generating scraping forces having a resultant force vector lying substantially in a plane through said longitudinal axis of said pipe and said seam; said scraping means being positioned behind a welding point inside the longitudinally welded pipe; a supporting frame and a positioning rod with an arm positioned upstream of said welding point in vicinity of an unclosed portion of pipe to be welded and outside the pipe for securing said scraping means; duplicating rollers rotating in an upper part of said supporting frame and positioned upstream as well as downstream of said welding point in a direction of motion of the pipe; said supporting frame comprising a removable box section and having guide means; said cutting means being movable back and forth in said guide means; said frame and said cutting means having openings and recesses for removal of the shavings.

9. An arrangement as defined in claim 8, wherein said cutting means travels parallel to said longitudinal axis of the pipe.

10. An arrangement as defined in claim 9, wherein said positioning rod has a slot receiving said supporting frame at a take-out end in relation to said direction of motion of the pipe; lateral bolts in recesses in lateral flanges of said slot in said positioning rod, said frame tilting on said lateral bolts.

11. An arrangement as defined in claim 9, wherein said guide means is a slot parallel to the longitudinal axis of the pipe at a bottom side of said supporting frame and defined by a lower web and two intermediate webs in said supporting frame; said cutting means having a knife holder matching an inner contour of said guide means and having a transverse groove adjacent one of said openings in said frame and between two of said recesses in a holder receiving a bottom knife; said intermediate webs having a bottom side with two transverse grooves; two upper knives upstream and downstream of one of said recesses in said direction of motion of the pipe and secured by said two transverse grooves in said bottom side.

12. An arrangement as defined in claim 9, wherein said supporting frame has means for intercepting and securing a scraping blade projecting beyond an upper edge of said frame and a maintenance aperture.

13. An arrangement as defined in claim 9, wherein said cutting means has an end facing away from said positioning rod and with means for receiving a carrier; a bell-shaped member with a graduated aperture and an elongated groove for receiving a linear actuator at an end of said positioning rod downstream of said supporting frame in the direction of motion of the pipe; said linear actuator having a threaded thrust rod extending out through an aperture in relation to the direction of the pipe and secured to said cutting means by a flange and said carrier, said carrier traveling back and forth in said elongated groove.

14. An arrangement as defined in claim 13, wherein said linear actuator comprises hydraulic cylinder and piston means.

15. An arrangement as defined in claim 13, wherein said linear actuator comprises pneumatic cylinder and piston means.

16. An arrangement as defined in claim 9, including a motor outside said pipe for driving said cutting means; a shaft through a slot in the pipe for transmitting actuating torque from said motor to said supporting frame.

17. An arrangement as defined in claim 9, including a friction wheel inside a pipe for actuating said cutting means, said cutting means being mounted on said positioning rod and being forced against an inner surface of the pipe.

* * * * *